(12) United States Patent
Aebi et al.

(10) Patent No.: US 6,375,073 B1
(45) Date of Patent: Apr. 23, 2002

(54) METHOD FOR CREDITING OR RECREDITING A DATA CARD WITH A GIVEN AMOUNT

(75) Inventors: Paul Aebi, Münchringen; Ronald de Bruin, Bremgarten; Andreas Martschitsch, Herzogenbuchsee; Rudolf Ritter, Zollikofen, all of (CH)

(73) Assignee: Swisscom Morris AG, Berne (CH)

( * ) Notice: Subject to any disclaimer, the term of this patent is extended or adjusted under 35 U.S.C. 154(b) by 0 days.

(21) Appl. No.: 09/242,900

(22) PCT Filed: Aug. 21, 1997

(86) PCT No.: PCT/CH97/00307

§ 371 Date: Apr. 20, 1999

§ 102(e) Date: Apr. 20, 1999

(87) PCT Pub. No.: WO98/09255

PCT Pub. Date: Mar. 5, 1998

(30) Foreign Application Priority Data

Aug. 29, 1996 (EP) .............................. 96810570

(51) Int. Cl.[7] .............................. G06F 17/60

(52) U.S. Cl. ................. 235/379; 235/380; 235/375; 235/381

(58) Field of Search .................. 235/380, 381, 235/375, 492, 487, 379, 468; 705/41, 39; 379/357

(56) References Cited

U.S. PATENT DOCUMENTS

| | | | |
|---|---|---|---|
| 5,359,182 A | 10/1994 | Schilling | 235/380 |
| 5,412,726 A | 5/1995 | Nevoux et al. | 380/24 |
| 5,504,808 A | * 4/1996 | Hamrick, Jr. | 235/380 |

(List continued on next page.)

FOREIGN PATENT DOCUMENTS

| | | |
|---|---|---|
| EP | 420 466 | 4/1991 |
| EP | 572 991 | 12/1993 |
| EP | 589 757 | 3/1994 |
| EP | 623 903 | 11/1994 |
| EP | 689 163 | 6/1995 |
| EP | 698 987 | 2/1996 |
| GB | 2 215 897 | 9/1989 |
| GB | 2308528 | * 6/1997 |
| WO | 95 35619 | 12/1995 |

Primary Examiner—Karl D. Frech
Assistant Examiner—Uyen-Chau N. Le
(74) Attorney, Agent, or Firm—Pillsbury Winthrop LLP

(57) ABSTRACT

A method for loading or reloading a SIM card (7) for a mobile device (6). The SIM card (7) has an electronic chip with a storage device (11). In the storage device (11) a monetary sum (28) is stored, and decreases as the mobile telephone is used. For loading or reloading the monetary sum, a prepayable value card (13) is purchased. The value card (13) has a code field (14) covered by a removable opaque layer (22). Upon removal of the layer (22), a code (15) becomes visible. The holder of the SIM card and the value card calls a service number using a communication apparatus (6, 8). The caller is thereby connected to a data base (17) in which all codes assigned to value cards (13) and the sum of money associated with each code are stored. The caller is prompted to enter the code (15) on the calling communication apparatus. The code (15) entered is compared with the codes stored in the data base (6, 8). If the entered code (15) is found in the data base, a short message containing the value of the monetary sum (28) to be loaded or reloaded is prepared and temporarily stored in a short message service center (18, 19). The monetary sum (28) and the code (15) are marked in the data base (17) as used or cancelled. The next time the SIM card (7) is inserted in any mobile telephone (6) and a connection is established with the communication network (9), the SIM card (7) to be loaded or reloaded is loaded or reloaded with the temporarily stored monetary amount (28) via of the prepared short message (20).

8 Claims, 6 Drawing Sheets

U.S. PATENT DOCUMENTS

| | | | | |
|---|---|---|---|---|
| 5,546,446 A | * | 8/1996 | Tsunokawa et al. | 379/114 |
| 5,621,787 A | * | 4/1997 | McKoy et al. | 235/381 |
| 5,721,768 A | * | 2/1998 | Stimson et al. | 235/380 |
| 5,777,305 A | * | 7/1998 | Smith et al. | 235/380 |
| 5,865,470 A | * | 2/1999 | Thompson | 283/70 |
| 5,903,633 A | * | 5/1999 | Lorsch | 235/382 |
| 5,915,226 A | * | 6/1999 | Martineau | 379/357 |
| RE36,365 E | * | 11/1999 | Levine et al. | 235/380 |
| 6,000,608 A | * | 12/1999 | Dorf | 235/380 |
| 6,085,099 A | * | 7/2000 | Ritter et al. | 379/357 |

* cited by examiner ium card, particularly a SIM card, can be reloaded or
METHOD FOR CREDITING OR RECREDITING A DATA CARD WITH A GIVEN AMOUNT This application is the national phase of international application PCT/CH97/00307 filed Aug. 21, 1997 which designated the U.S.

BACKGROUND OF THE INVENTION

This invention relates to a method for loading or reloading a data medium card, especially an SIM card for a communication device associated with a communication network, with a monetary sum, this data medium card being provided with a storage means in which the monetary sum is stored.

SIM (Subscriber Identification Module) cards are customarily used nowadays in mobile telephones in a mobile network according to the GSM (Global System for Mobile Communications) standard. Among other things, SIM cards serve to identify a subscriber and serve the subscriber-earmarked billing of telephone calls made by that subscriber over the mobile network. In contrast to wire-connected telephone apparatuses, the loads in GSM networks are no longer billed to a permanently installed apparatus, but rather directly to the holder of the respective SIM card.

European Patent Application EP 0 689 368 discloses a device for transmitting messages in a mobile communication network where the use of SIM cards, particularly for transmitting short messages, is extended to the processing of special services according to a special procedure accessible only to certain authorized subscribers. This device offers the possibility not only of transmitting any desired bit streams in transparent mode according to the GSM Phase 2 standard as a short message from a service center to the SIM card, but also of sending or receiving data and executable instructions to or from authorized subscribers. This is done without having to modify internationally established standards.

SUMMARY OF THE INVENTION

The present invention now describes a certain special service, or respectively a certain function, viz., a method of loading or reloading a data medium card, especially a SIM card, with a monetary sum, which card is used together with the device disclosed in the above-mentioned European patent application. Although not contemplated at present, it is conceivable to use SIM cards for operating wire-connected communication apparatus as well and to carry out the billing no longer connected to the apparatus, but rather to the card.

On the SIM card is an electronic chip which can be electrically connected, via a contact field, which consists of a plurality of individual electrical contacts, to a read-write device disposed in the communication apparatus. The chip comprises, among other things, a storage means in which a monetary value is stored. When telephone calls are made or when other services are performed, debits are gradually made against the stored value and the amount must be reload by the card holder when it reaches zero or a certain minimum. Until now, this procedure has been relatively complicated. It is namely intended that the card holder pays a certain amount of money at a post office, which monetary sum is then transmitted by the postal service to an electronic billing module (Customer Care and Billing System for Mobilcom, or MOBIA). The sum paid in by the subscriber is then transmitted by the billing module as a monetary sum, together with the subscriber's identification data, to an operating center for special services (SIM Service Center, or SSC). There, according to a special service or function, a short message is prepared which then, the next time the subscriber uses the telephone, transmits the monetary sum to the SIM card by means of a short message, and reloads or loads the respective amount onto the monetary value stored there.

This procedure which belongs to the state of the art is illustrated in the block diagram for a mobile network in FIG. 1. Reference numeral 1 thereby designates a postal deposit slip by means of which a payment can be made at a payment point such as a post office 2. The correspondingly paid in monetary sum is forwarded as a monetary value, together with the subscriber identification, to the aforementioned billing module 3, which ensures that a short message is prepared in a service center for special services 4. This short message 5 is then transmitted via a mobile telephone 6, the next time the respective subscriber uses it, to his SIM card 7 inserted in that telephone 6. The monetary value contained in the short message is stored on the SIM card 7. This card is reloaded or loaded with the paid-in monetary sum.

This procedure, particularly for carrying out the payment at a post office, is relatively complicated. It is therefore the object of the present invention to look for a solution with which the paying in of a monetary sum to load or reload a SIM card is simplified.

This object is attained with a method having the steps set forth in the characterizing part of claim 1.

A main advantage of the inventive method is that the value card can be purchased at many sales outlets, such as shops, kiosks, or post offices. This eliminates the tiresome procedure of filling out a deposit slip and depositing an amount at a post office to load or reload a certain data medium card, particularly a SIM card.

The amount to be paid for a value card corresponds at the same time to the maximum sum by which a certain data medium card, particularly a SIM card, can be reloaded or loaded.

The value card has a concealed code field which serves the added purpose of indicating, when its covering is intact, that the card has not yet been used. After the code field has been uncovered, e.g., by scraping away a concealing layer, a code is exposed which serves to prepare the reloading or loading of a certain SIM card via any desired communication device connected to a public communication network. After calling a certain service number, the holder of the value card is prompted by means of an audio response menu to enter the code into the communication device, e.g., to key it in. The subscriber is thereby connected to a data base in which all the codes and associated monetary sums are stored for which value cards have ever been produced. If the keyed-in code is found in the data base, a short message is prepared according to the GSM Phase 2 standard and is filed in a short message service center. At the same time, the code and the associated monetary sum are marked as used in the data base or are cancelled. If the subscriber calls the aforementioned service number using a communication apparatus in which his SIM card is inserted, his personal identification stored on the SIM card is automatically recognized. After the code has been entered, it is known to whom the monetary sum is to be credited. The short message prepared and stored in a short message service center contains the subscriber's identification code and the monetary sum. If the call to the aforementioned service number is made from a communication apparatus in which no SIM card can be used, e.g., from an ordinary telephone, the subscriber is prompted after entering the code to enter also the identification code of the SIM card for which the monetary sum is intended.

The value card can also be used for normal telephoning. In this case, in one process step, after calling the aforementioned service number, the caller is asked by means of automatic voice output whether a data medium card is supposed to be loaded or reloaded, or whether a telephone call is to be made. In the case where a telephone call is made, after the code number is entered, the amount for the call is calculated on the basis of the subscriber called and the length of the call, and is either recorded in the data base or already deducted from the monetary sum stored there. In this case, if a data medium card is subsequently loaded or reloaded, the full monetary sum can obviously no longer be credited but only the remainder after deduction of all amounts for calls.

As already mentioned, the value card has a field containing a code which is concealed by an opaque, removable layer when purchased. Complete concealment of this field is a guarantee that the purchased value card is really new and has never been used. A similar card having a layer to be scraped away is described in European Patent Application Publication No. 0 689 163 A1. There it is a question of a data medium card comprising a chip having a plurality of electrical contacts for connection to a card reader. In order to determine whether or not the data medium card has already been used, at least some of the electrical contacts are covered by a layer which can be scraped away. The card is used for making telephone calls. It has in addition in the chip a certain number of call units which are gradually debited during telephoning. The card can also have a second concealed field covered with a layer to be scraped away, in which field a lottery number becomes visible, for instance, after it has been scraped. However, this prior art card is not intended for crediting other data medium cards with a monetary sum.

Value cards which comprise a code, which must be given to a service center in order to be able to gain access to certain telephone services is already known from WO 95/35619. It is not described in this document, however, how such data medium cards can be loaded or reloaded.

EP-A1-0 589 757 describes a method to transmit prepaid reload amounts through a telecommunications system. This application describes above all the securing of the transmission.

Until now it is provided that the communication apparatus which can be operated with the data medium card, particularly with a SIM card, is a mobile telephone having a card reader based on the GSM standard. Although not yet currently planned, it may naturally be provided in the future that wire-connected telephones, too, may have a card reader and be used with a SIM card belonging to the respective subscriber or caller. The whole billing procedure of the telecommunications company would then no longer take place per wired, wire-connected communication apparatus, such as a telephone, but exactly the same way per SIM card holder instead.

As described above, the subscriber is guided by an audio response system. This system is constructed as a speech server which is integrated in the communication network and can be called by means of the aforementioned service number. Access to the speech server may take place via a wire-connected communication network or a mobile network. The installation likewise comprises a billing module connected to the audio response system and the data base, on the one hand, and, on the other hand, has a connection to the short message service center. The purpose of this billing module is, for one thing, to forward to the short message service center messages which come from the data base and contain an identification code and a monetary sum by which the SIM card indicated by the code is to be loaded or reloaded, and for another thing, to prepare respective short messages for sums of money deposited according to the state of the art.

BRIEF DESCRIPTION OF THE DRAWINGS

The invention will now be described in more detail with reference to the accompanying drawings, in which.

DETAILED DESCRIPTION OF THE PREFERRED EMBODIMENT

Figure 1:
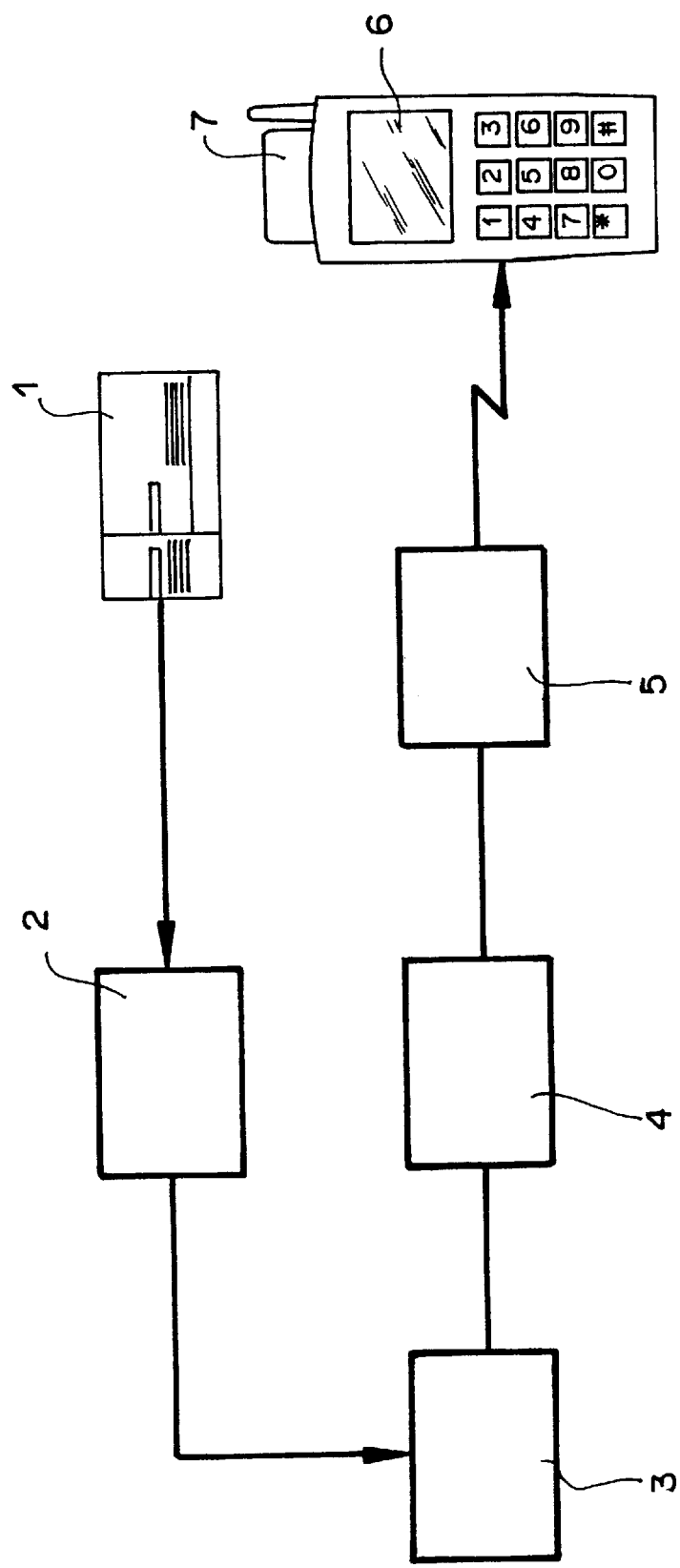
FIG. 1 is a block diagram of the method according to the state of the art.

FIG. 1 illustrates in a block diagram a state of the art already described in the introduction to the specification.

Figure 2:
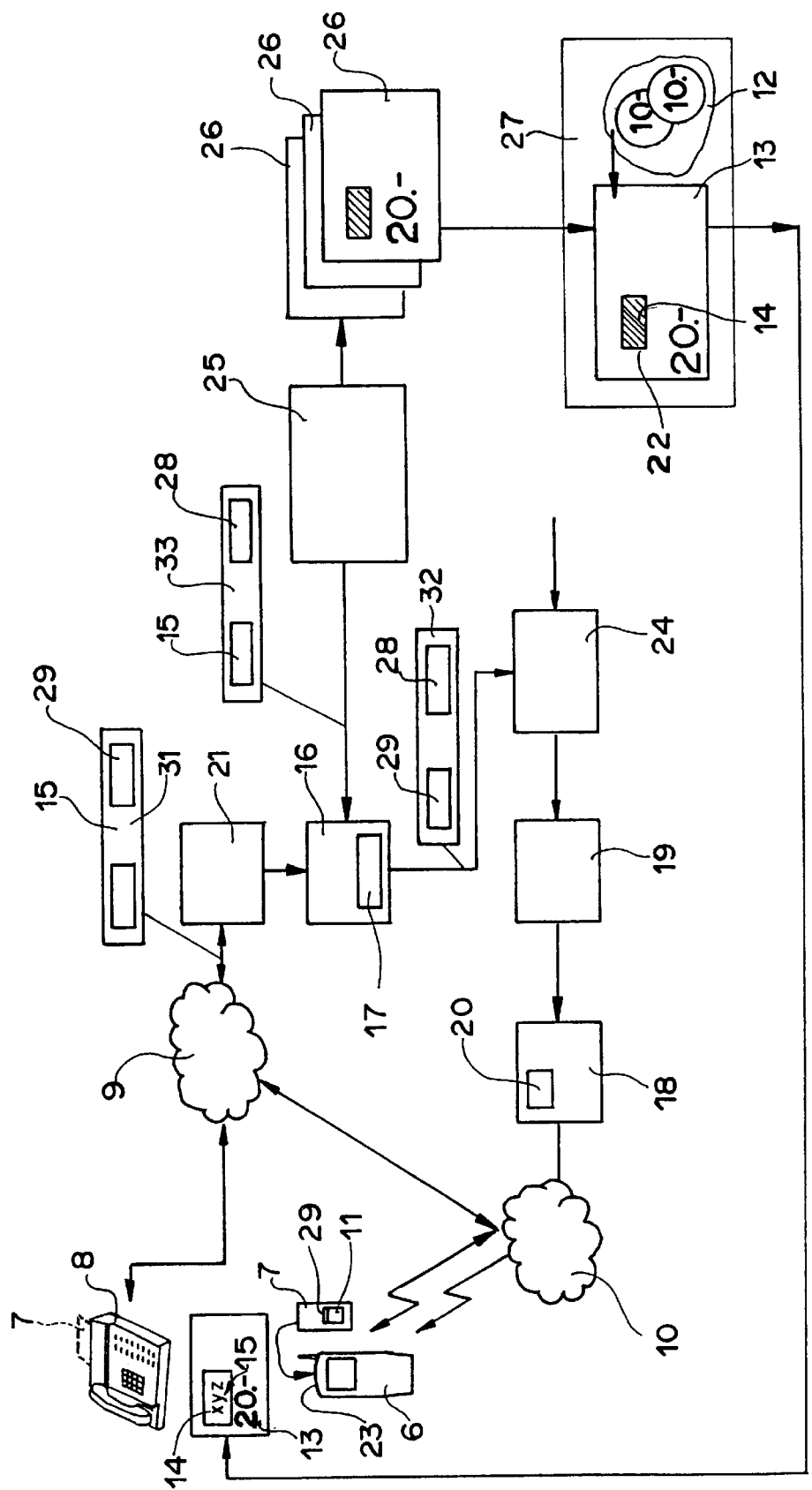
FIG. 2 is a block diagram illustrating the method according to the invention.

FIG. 2 shows in a block diagram hardware components needed for carrying out the method according to the invention.

Reference numeral 25 designates a plant where value cards, e.g., of cardboard or plastics, are produced. Imprinted on each value card is a monetary value, e.g., 10, 20, 50, or 100 units of currency. Each value card 26 is provided in an area intended for that purpose with a code 15 on a code field 14. The field 14, or respectively this region, is then covered with a removable layer 22, which is opaque so that the code on new value cards 26 is no longer visible. Advertisements, for example, may be printed on the surfaces of the value cards. It is also possible to print thereon instructions for using the value card. It may already be mentioned at this time that when the value cards are produced at the plant 25, the code 15 and monetary sum 28 associated with each new value card 26 produced are transmitted in a status block 33 to a rating platform 16 and stored there in a data base 17.

The newly made value cards 26 are then sent to sales outlets 27, e.g., to kiosks, shops, post offices, etc. In as wide a sales network as possible, the value cards may be purchased by paying an amount of money 12 equal to the sum printed on the value card. Hence the value card 26 is also called a prepayable value card 13.

A data medium card 7 intended to be loaded or reloaded comprises in an electronic chip a storage means 11 in which, besides an identification code 29, the value of a monetary sum is also stored, among other things. The value need not necessarily correspond to an amount of currency but may be divided into rate units instead. For communication apparatus used in a mobile network, the identification code may be the mobile telephone system number, for instance.

For loading or reloading the data medium card 7, this card is inserted in a card reader 23 provided for that purpose in a communication apparatus 6, usually a mobile telephone. The removable layer 22 of the prepaid data carrier card 13 is now removed. The removable layer 22 is preferably made so that it can just be scraped off with a fingernail. The code 15 in the code field 14 then becomes visible.

Figure 3:
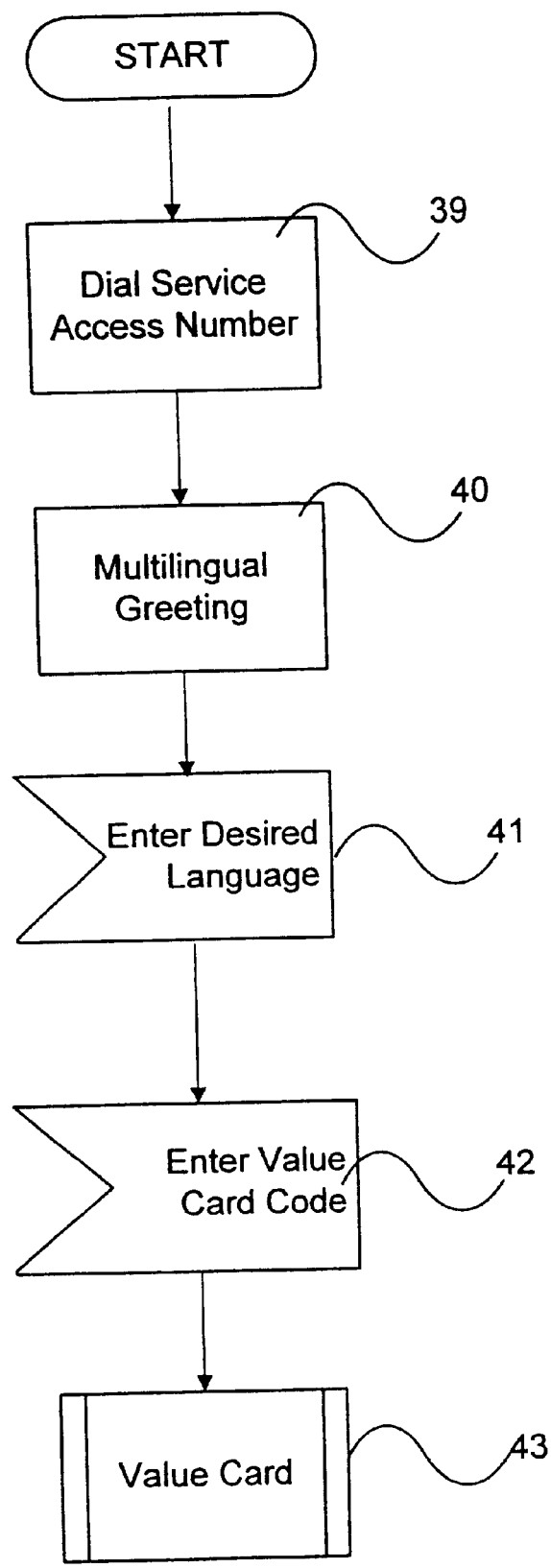
FIG. 3 is a first flow chart showing the steps at the beginning of the method according to the invention.
Figure 4:
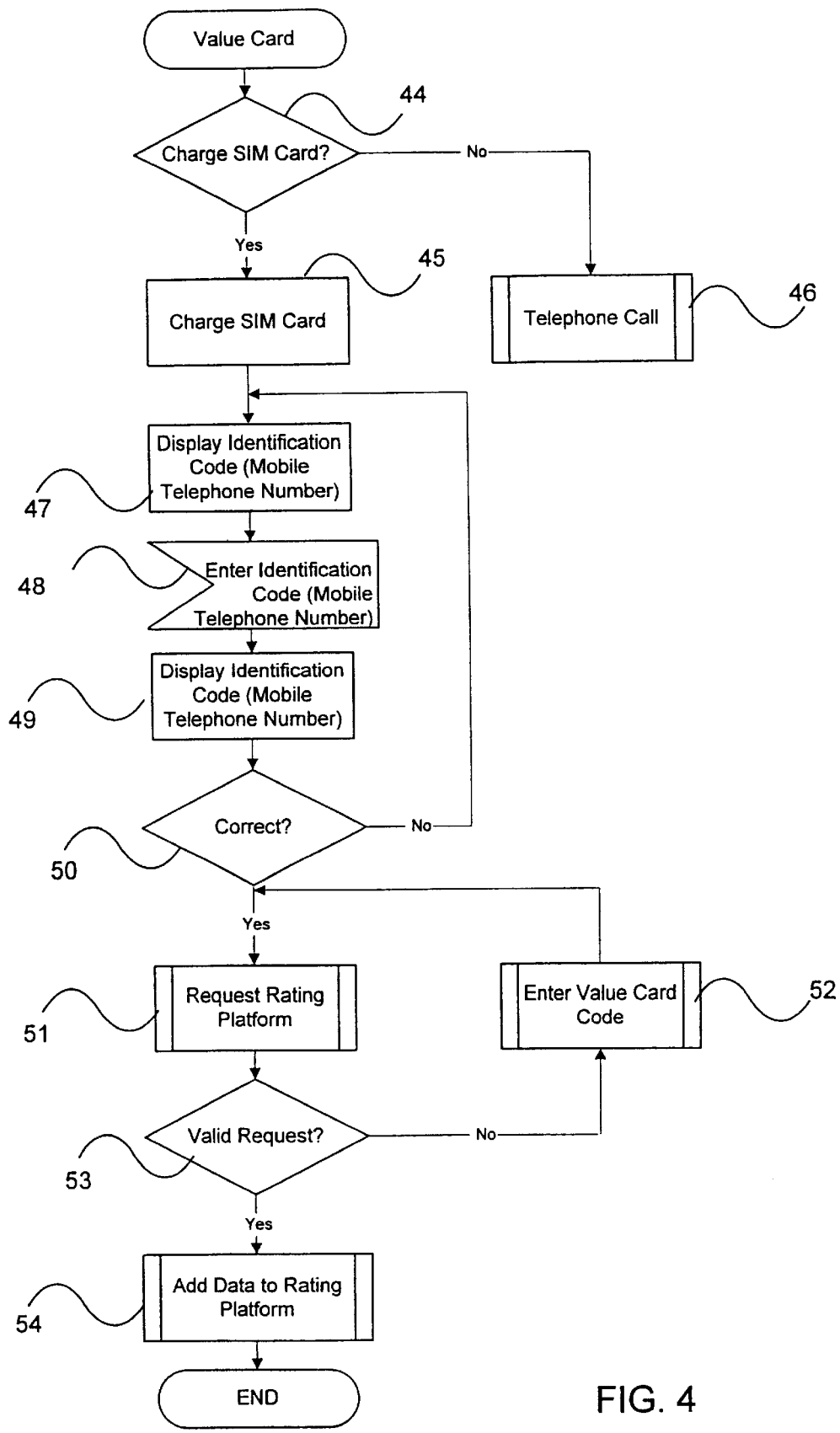
FIG. 4 is a second flow chart showing the steps for loading or reloading a certain data medium card according to the present invention.

In further steps of the method for loading or reloading the data medium card, which may also be seen in the flow charts of FIGS. 3 and 4, a service number is now dialed. The service number may be printed on the value card. After the service number has been dialed, the mobile telephone in the example shown is connected over the communication network 10, operating in a wireless way, the mobile network, and over the communication network 9, operating in a wire-connected way, for example an ISDN, to the voice output system 21, a speech server 21. This operation corresponds to block 39 of the flow chart of FIG. 3. According to block 40, the subscriber is greeted in several languages. According to block 41, the speech server now prompts the subscriber by means of a spoken communication to enter the desired menu language. Depending on the region, the subscriber may choose from among several languages, say, German, French, Italian and English, for instance.

After this has taken place, the speech server prompts the subscriber, according to block 42 in the flow chart of FIG. 3, in the selected language to enter the code of his value card.

Based upon the value card code entered by the subscriber, the speech server recognizes the type of card. The value card can thereby be distinguished from other telecommunications cards, such as, for example, the Swiss Telecom card, intended for other functions. This operation is symbolized by block 43 of the flow chart in FIG. 3.

Two functions are foreseen for the value card: firstly, the loading or reloading, according to the invention, of a data medium card with a monetary sum, and secondly, the use of the value card for making ordinary telephone calls. The flow chart in FIG. 4 shows the steps of the method to be carried out for loading or reloading the data medium card. After entering the service service number, the subscriber is prompted per block 44 of the flow chart of FIG. 4 to enter whether he would like to make a telephone call or load a data medium card. In the flow chart shown in FIG. 4, the subscriber selects loading or reloading of the data medium card, as indicated by block 45. The subscriber is now prompted to enter the identification code or respectively the mobile telephone system number of the data medium card he would like to load with a monetary sum. If, as in the example just described, the subscriber has dialed the service service number from a mobile telephone, the identification code for the data medium card inserted in the mobile telephone can be directly shown on a display of the mobile telephone (block 47). If it is this data medium card which is supposed to be load, the subscriber need only confirm the identification code displayed. Otherwise, he is prompted by the speech server to enter the correct identification code. This procedure is depicted in blocks 48, 49, and 50 of FIG. 4. Once the correct identification code has been entered, the method of loading or reloading the data medium card now specified proceeds as follows. Per block 51 of FIG. 4, a query is made in the data base 17, or respectively a rating is undertaken. For this purpose, the voice output system 21 is likewise connected to the rating platform 16 containing the data base 17. In a message block 31, the code 15 entered by the subscriber on the mobile telephone 6 and the identification code of the data medium card to be reloaded or loaded with the monetary sum of the value card are communicated to the rating platform 16. The rating platform now searches the data base 17 for the code corresponding to the entered code 15, the former code having been stored there when the value card was produced, as already mentioned. If the code is not found, the subscriber is prompted via the speech server, according to the loop formed by blocks 53, 52, 51 in FIG. 4, to enter the code 15 correctly. If this is done, and if the correct code 15 is likewise found in the data base 17, the procedure is terminated for the subscriber. The rating platform now transmits a message block 32, containing the identification code 29 of the data medium card to be loaded or reloaded, as well as the value of the monetary sum or the number of rate pulses with which the designated data medium card is to be loaded or reloaded, to a billing module 24. The monetary value 28 or the number of rate pulses by which the data medium card, designated by the identification code 29, is now to be loaded, has been determined from the data base. This sum was associated with the identification code there. After the message block 32 has been created, the respective code 15 in the data base 17 is marked as having been used or is cancelled.

Based upon the data contained in the message block 32, the billing module 24 initializes the creation of a short message 20 via the operating center for special services 19 in the short message service center 18. There the short message 20 is stored in a data base. The next time the data medium card 9 designated by the identification code is activated in a mobile telephone 6, i.e., when the telephone is switched on, the short message 20 is transmitted, and the data medium card is loaded or reloaded with the respective monetary sum or respectively with a certain number of rate pulses via the mobile network 10. The procedure is thereby ended.

As indicated by reference numeral 8, the loading or reloading operation may likewise be carried out from any ordinary telephone wire-connected to a telephone network—here, for example, to an ISDN network 9. In this case, the subscriber must enter manually the identification code or mobile telephone number of the data medium card to be loaded or reloaded. As described above, the subscriber will be prompted to do this by means of a spoken message from the voice output system 21. The data medium card 7 shown in dashed lines at the telephone set 8 indicates that in the future it might also be possible that every wired telephone 8 will no longer be identified by its telephone number but by the data medium card to be inserted in this telephone apparatus for calling. The billing of the telephone charges would then no longer take place to a certain telephone, but instead, as is customary in GSM mobile networks, to a data medium card, especially a SIM card. Although such an embodiment is not provided at this time, it is also intended to be comprised by the present invention.

Instead of the data being entered by means of a service service number, a short message under the GSM standard may be used.

Figure 5A:
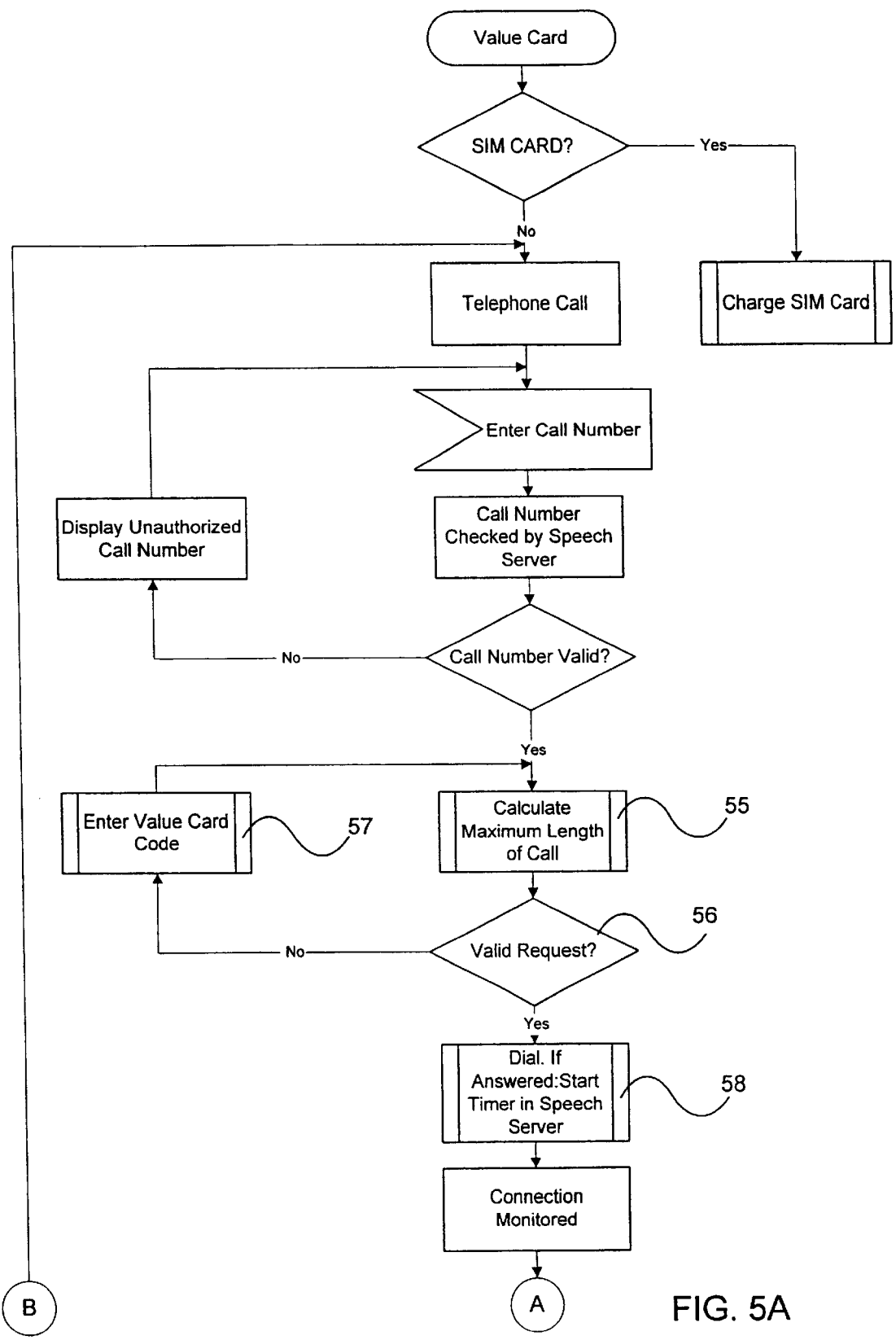
FIGS. 5A and 5B are a third flow chart showing the steps of the method when using the value card according to the invention for ordinary telephoning.
Figure 5B:
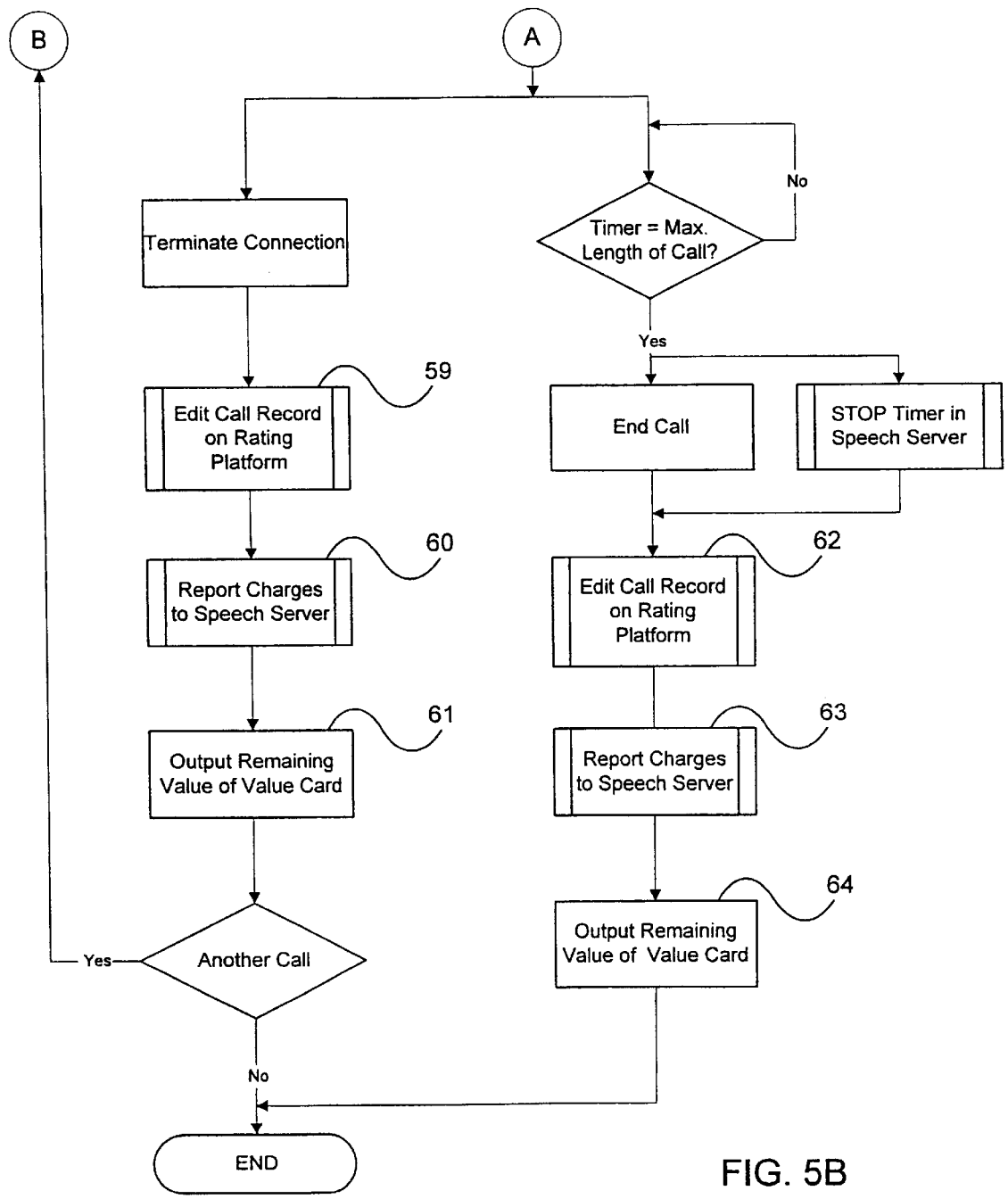

As already stated, the value card 13 may also be used for ordinary telephoning. The individual steps of this method are shown in the flow chart of FIG. 5. Since the actual telephoning by means of the value card does not form part of the invention, and since the flow chart of FIG. 5 is self-explanatory, the telephoning procedure need not be explained in detail. It is only to be pointed out that after the telephoning option has been selected, and after the telephone number of the subscriber being called has been keyed in on the telecommunication apparatus, the maximum calling duration is calculated per block 55 on the basis of the location of the calling subscriber and the value of the monetary sum in the data base 17. If no calculation can take place because the code 15 of the value card cannot be found in the data base 17 of the rating platform 16, the code is further searched (loop of blocks 56, 57). If the request is valid, the connection to the subscriber being called is established. After a connection has successfully been established, a timer is started in the speech server, and the maximum calling duration previously calculated is monitored. When the connection is terminated, the cost of the call is calculated in the rating platform 16. The cost of the call, or the number of rate pulses corresponding to the cost of the call, is stored in the data base 17 of the rating platform 16 as the value of the calling amount. Upon loading or reloading the data medium card according to the flow chart of FIG. 4, in case telephone calls have been made, it is now not the nominal monetary value printed on the value card which is credited but rather that value minus the sum of all calling amounts. If the rate pulses are counted, the difference in value may likewise correspond to a number of rate pulses. This procedure takes place per blocks 59 and 60 of the flow chart of FIG. 5. At the end of each call, the remaining monetary sum on the value card is communicated to the calling subscriber.

When the maximum calling duration calculated has been reached, the call to the called subscriber is automatically terminated. Per blocks 62 and 63, the calling amount is calculated in the same way as described with reference to blocks 59 and 60 and is filed in the data base 17 of the rating platform 16. The difference between the nominal monetary sum on the value card and the sum of all calling amounts is now zero. Accordingly, per block 64, the calling subscriber is informed that the monetary sum on the value card has been used up.

If a subscriber tries to telephone after the monetary sum on his value card has been transferred to the data medium card, or if it is attempted to reload or load the data medium card a second time using the same value card, a lockout module (not shown in the flow charts) ensures that the subscriber of the communication apparatus is informed that the value card is invalid. He is prompted a few times to enter a correct code. Since he cannot do so, the program is terminated.

What is claimed is:

1. A method for loading or reloading a data medium card with a value of a sum of money, which data medium card is provided with an electronic chip including a storage device in which the value of the monetary sum is stored, comprising:

purchasing a prepayable value card for a certain amount of money, exposing a concealed code field on the value card by the owner of the card, whereby a code becomes visible, calling a service number for a communication network from a communication apparatus, whereby a caller is connected to a data base in which all codes assigned to value cards and the amount of money associated with each respective code are stored, prompting the caller to enter the code in the calling communication apparatus, comparing the entered code with the codes stored in the data base, if the entered code is found in the data base, preparing a short message with the value of the sum of money to be loaded or reloaded in a short message service center, and temporarily storing the short message, marking as used or canceling the value of the monetary sum and the code in the data base, and loading or reloading the data medium card to be loaded or reloaded with the temporarily stored value of the monetary sum via the prepared short message the next time the data medium card is inserted in a communication apparatus and a connection is established with the communication network, wherein the data medium card is a SIM card for a communication device associated with a communication network.

2. The method according to claim 1, wherein after the entering of the service number, the communication apparatus is connected to a voice output system, and the further portions of the method are carried out voice-controlled.

3. The method according to claim 1, further comprising using the value card for telephoning, a calling amount being calculated from the length of the call to a called subscriber, and the calling amount being recorded in the data base or deducted from the value of the monetary sum upon termination of the call, wherein only the difference between the value of the monetary sum and the sum of all calling amounts is then used for loading or reloading the data medium card.

4. The method according to claim 1, wherein the communication apparatus for calling the service number is selected from the group consisting essentially of wireless communication devices working according to the GSM standard and wire connected telephone sets.

5. A method for loading or reloading a data medium card with a value of a sum of money, which data medium card is provided with an electronic chip including a storage device in which the value of the monetary sum is stored, comprising:

purchasing a prepayable value card for a certain amount of money, exposing a concealed code field on the value card by the owner of the card, whereby a code becomes visible, preparing a short message according to the GSM standard, entering the code in the communication apparatus used when prompted to enter a message text, and communicating the short message to a data base in which data base all codes assigned to value cards and the amount of money associated with each respective code are stored, comparing the entered code with the codes stored in the data base, if the entered code is found in the data base, preparing a short message with the value of the sum of money to be loaded or reloaded in a short message service center, and temporarily storing the short message, marking as used or canceling the value of the monetary sum and the code in the data base, and loading or reloading the data medium card to be loaded or reloaded with the temporarily stored value of the monetary sum via the prepared short message the next time the data medium card is inserted in a communication apparatus and a connection is established with the communication network, wherein the data medium card is a SIM card for a communication device associated with a communication network.

6. The method according to claim 5, wherein after using the short message, the communication apparatus is connected to a voice output system, and portions of the method are carried out voice-controlled.

7. The method according to claim 5, further comprising using the value card for telephoning, a calling amount being calculated from the length of the call to a called subscriber, the calling amount being recorded in the data base or deducted from the value of the monetary sum upon termination of the call, wherein only the difference between the value of the monetary sum and the sum of all calling amounts is then used for loading or reloading the data medium card.

8. The method according to claim 5, wherein the communication apparatus used for preparing the short message is selected from the group consisting essentially of wireless communication devices working according to the GSM standard and wire connected telephone sets.

* * * * *

UNITED STATES PATENT AND TRADEMARK OFFICE
CERTIFICATE OF CORRECTION

PATENT NO.   : 6,375,073 B1
DATED        : April 23, 2002
INVENTOR(S)  : Aebi et al.

It is certified that error appears in the above-identified patent and that said Letters Patent is hereby corrected as shown below:

<u>Title page,</u>
Item [73], Assignee: Please change "Swisscom Morris AG" to -- Swisscom Mobile AG --

Signed and Sealed this

Thirty-first Day of December, 2002

JAMES E. ROGAN
*Director of the United States Patent and Trademark Office*